Patented June 28, 1927.

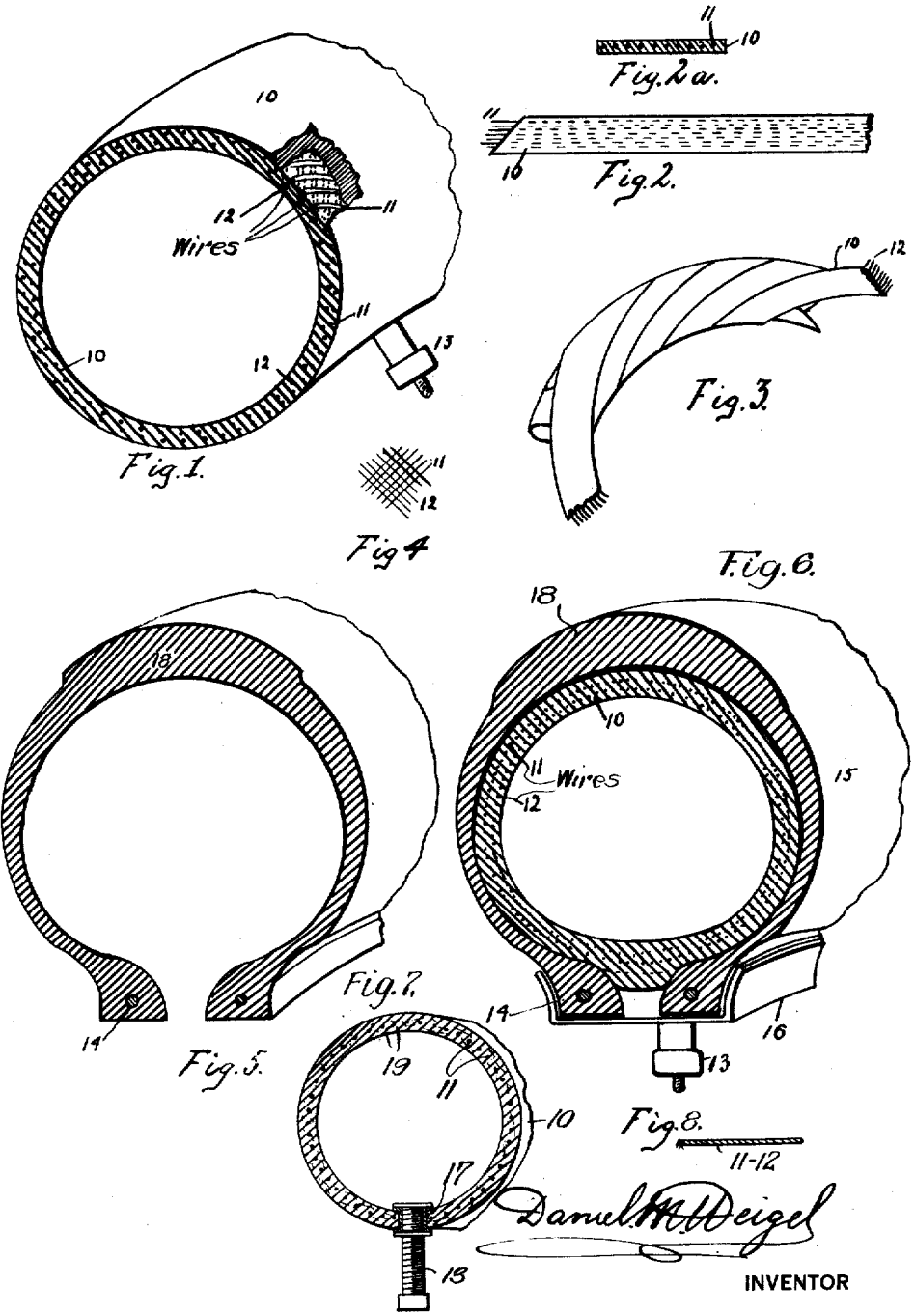

1,633,963

UNITED STATES PATENT OFFICE.

DANIEL M. WEIGEL, OF TRENTON, NEW JERSEY, ASSIGNOR, BY MESNE ASSIGNMENTS, TO THE AMERICAN WIRE CORD TIRE COMPANY, OF WILMINGTON, DELAWARE, A CORPORATION OF DELAWARE.

PNEUMATIC TIRE.

Application filed August 20, 1921. Serial No. 493,887.

The present invention is directed to improvements in tires, and has for its principal object the provision of a tire which will not be subject to the disadvantages of the tires now in use.

Pneumatic tires, as now generally used, comprise (a) an inner air tube (b) a casing. The casing is comprised of three main parts, viz—the body portion made of rubber; the bead portion; being the two side beads which hold the casing to the rim; and the carcass usually made of cotton fabric, or cotton cord, which is anchored round the beads. This carcass constitutes the flexible load carrying and strain resisting structure. The body portion merely serves as a protect'on to the carcass.

Such tires are defective and ill adapted for the purpose they serve. The thick plies of cotton that go to build up the carcass are not as flexible as necessary. The said carcass is built up of many layers held together by rubber adhesion, and finally the body of rubber is adhered to the top layer. These are all liable to pull apart, due to strains and stress when the tire is in use upon the roads and usually separation of these various layers takes place.

The carcass is also liable to quick deterioration due to moisture entering through cuts in the rubber of the body portion.

One object of the present invention is to make a casing with a bead portion but without a carcass. That is to say, a casing of rubber, or rubber compound and beads only.

Another object is to make a flexible inner tube that will take the place of the said carcass and bear the load and strains.

Another object is to make an inner tube that combines a carcass and air tube.

Another object is to provide a construction that has all the necessary elements of a by the inner tube, more than by the casing, but in which the load and strains are borne by the inner tube, more than by the casing, Another object is to eliminate vegetable fibre such as cotton cord or fabric as the means of bearing load strain and stresses.

Another object is to make a pneumatic tire with a load strain, and stress bearing inner tube, the said inner tube protected by a detachable casing.

Another object is to provide a construction in which the internal air pressure is resisted by flexible wires and the rubber of the inner tube, the said wires acting as the means to take the loads and strains imposed upon the tire when in use.

Another object, resides in the provision of a wire and rubber tire of such type that it will be highly flexible and not subject to internal friction between adjacent load carrying wires.

Another object resides in providing a tire that does not transmit load, strains and stress to the beads.

Another object is to provide a construction in which a plurality of plies of wire may be used without the wires of one layer contacting with the adjacent plies and also provides that one wire does not contact with any other wire.

Another object is to construct a casing that is formed of a homogenous mass of rubber from inside to outside.

Another object is to provide an inner tube of a homogenous mass of rubber and metallic wires and one in which each wire may flex independently of the other wires, and in which the flexing of the wires will be localized within the region subject to flexure. Otherwise stated, one object is to provide a tire having load carrying wires in which the minimum of movement is transmitted from wire to wire, or to any other portion of the tire when a certain part of the tire, or a certain wire or wires is subject to flexure.

Another object is to eliminate merely flexible material and substitute material whose motion is molecular so that such material can be distorted and be subject to a variety of forces in many directions at the same time, and to govern such molecular motion through load, strain and stress bearing wires embedded in such material.

Another object is to protect the said carcass, or load bearing inner tube, from road wear by covering it with a detachable casing.

Another object is to have the casing and carcass independent of each other.

Other objects and advantages of my tire will be further set forth in the accompanying specification and claims, and shown in the drawings which illustrate by way of exemplifications, one embodiment of my invention. Various attempts have been made to use flexible wire in the manufacture of tires, but in all these proposed constructions certain disadvantages have arisen which have made such tires uncommercial and unsatisfactory. It may be pointed out that a tire made in accord with my invention has no interlocking connections between adjacent wires nor are wires supplementary to canvas fabric. The present construction is directed to provide for complete freedom of movement of the wires unimpeded by any connection with adjacent wires. It is also directed to eliminate load and strain transmission to the bead and to any anchorage at the beads or to any uneven motion upon the wires that might tend to direct the bending of the wires along any particular line. It is also intended to protect the most costly and most important part of the tire, that is to say, the carcass, and provides for a carcass independent of the casing, so that a cheap casing can be constructed and when worn out be replaced as coverings to the more expensive carcass.

Figure 1 shows the combined air tube and carcass with certain parts broken away to show the interior.

Figure 2 shows a strip of soft rubber with flexible wires embedded therein; and Figure 2ᴬ shows a section thereof.

Figure 3 shows how Fig. 1 is made up from Figure 2.

Figure 4 is a diagrammatic view of the wire crossing when two strips of Fig. 2 are wrapped in opposite directions.

Figure 5 is a perspective sectional view of the casing and beads.

Figure 6 is a perspective sectional view of the tire complete.

Fig. 7 is a view similar to Fig. 1 but shows a single layer of wires in the tube.

Fig. 8 shows a short section of one of the twisted wire strands which is preferably used.

Broadly the tire which forms the subject matter of the present invention comprises an inner air tube—Fig. 1 made of rubber designated 10 and within the rubber are embedded suitable flexible metallic load, strain and stress carrying wires—Nos. 11—12, which extend preferably diagonally and in opposite directions completely round the tube. This tube is made up as shown in Fig. 3.
Long strips (Fig. 2) of rubber—"10," are prepared, and embedded in such strip, by any means, are flexible wires—"11"—running longitudinally with the edges of the rubber. These wires are placed sufficiently close together to prevent the air from within (when inflated) rupturing the rubber between. One such strip is wound preferably diagonally in one direction, and a second strip wound preferably diagonally in the opposite direction. As each wire is separated from the adjacent wire by the rubber it will be seen that when the tube is completed with two or more plies, each wire is separated from every other wire and contacting is impossible. The whole is firmly rolled together and unified, forming a homogeneous mass of rubber with the wires embedded within and sufficiently close together, yet apart, that the intervening rubber cannot be stretched sufficiently to permit the air pressure rupturing the rubber. Fig. 3 shows how one of the above described strips (Fig. 2) is wrapped and the second ply is wrapped superimposed upon the first but in the opposite direction. One or more plies can be thus employed. Fig. 8 shows a tire made up of a single ply or single strip. The tube being of rubber will conform to the varying circumferences and permit the wires to also conform without crimping or gaping of the material. This tube may be constructed upon a core conforming to the desired shape and vulcanized thereon, and after removal the ends may be joined. Or it can be made on a straight mandrel and also joined before or after vulcanization; or it may be wrapped upon an air bag and vulcanized thereon. It can be made several ways and the above are merely for illustration. But the main features show how individual metallic flexible wires may be so embedded in rubber as to permit of a homogeneous air tube being constructed without tucks or crimps and permit the wires conforming to the necessary varying radii.

Inserted in such tube is the necessary air valve—"13." Any means may be taken to secure this valve and around such spot it may be necessary to strengthen it with canvas or the like, as shown in Fig. 7, in which the fabric is "17."

It is now seen that when this tube is inflated, its expansion is limited to the circumference of the wires wrapped around it. Due to these wires being of a flexible nature and embedded in a material of molecular motion the material is, as a whole, very flexible. The rubber will be distorted within the limits of the movement of the wires and which movement is subject to the forces of impact and contact with the road. The wire strands, (see Fig. 8) being preferably twisted wire strands, having a high tensile strength, will withstand the strains and stress from impact and all strains and stress set up in the usual way when the tire is in service. These strains are not transmitted to the beads or rims, they are limited so far as is desired, to the tube itself and travel around the wire in its circuit of the tube, hence the strains are more evenly distributed than where shorter cords or yarns are anchored to a bead, and in such distribution are not localized. Whilst the strain is distributed, the motion is, however, localized, within the area of the impact, due to the wires not contacting on each other and the medium in which they are embedded being elastic.

Whilst I describe the wires as being diagonally disposed yet any angularity will do, and the wires may be wrapped helicoidally at any angle. One single ply may serve or several plies may be used. Fig. 1 shows a double ply tube and Fig. 8 a single ply tube.

The tube described is covered with a casing of the usual shape with beads—"14"—which may be clincher or straight side, embedded in each of the edges. The peculiarity and novelty of this casing is that it may be made entirely of rubber—"15"—from inside to outside. The carcass or non-stretchable element is the tube, hence the casing cannot stretch beyond the limits of the tube and therefore requires no means, for itself, to prevent it. The tube also bears the load strain and stress, hence this service is not required of the casing.

The whole tire is shown in Fig. 6. The designation "18" is the casing and held on rim "16" by the beads "14" in the usual way. The tube "10" in which is embedded the strain and load bearing wires "11—12", is inflated through valve "13". It is preferable that the interior diameter of the casing is slightly smaller than the exterior of the tube, so that when the tube is inflated the casing will sufficiently stretch to permit of the fit being exact and thereby prevent chafing.

The construction of my tire throws the strains, load and stress to the inside of the tire and evenly distributes them circumferentially and radially and relieves pressure on the bead. It protects the load bearing carcass, which if punctured can be removed and repaired. It protects the carcass by an independent removable covering and permits the replacement of such casing inexpensively whilst retaining the more important carcass in service.

When it is desired to strengthen the rubber part of the tube portion for any reason, such as to permit wider spacing of the wires, I may intimately mix with the plastic rubber during the process of milling, short lengths of cotton yarn cotton waste, or like material. The principle embodied in my invention is not hereby affected, as the yarn 19 (Fig. 7) may help to plug the interstices between wire and wire, but does not bear the load or carry the strains, but merely decreases the tendency of the rubber to rupture.

The finished tire comprises a casing of a homogenous rubber mass from inside to outside. Imbedded therein, in the usual way, are the beads. The said casing mounted on a rim in which the beads fit in the usual manner. Within the interior of the casing an inner tube composed of a homogenous mass of rubber and embedded in such rubber, rupture resisting metallic flexible wires. Each wire separated from adjacent wires by the rubber of the tube portion. The wires coacting with the rubber which itself is sufficiently strong to resist rupture due to the pressure of the contained air. The wires being independent of each other do not abrade or rub each other, nor do they impede the free and localized flexing of the tire when in use. There are no layers adhering to each other and there is no tendency for a separation of the components as with vegetable fibre tires. The tire is very flexible and efficient. The wearing out or accidental destruction of the casing does not destroy the carcass, but a new casing can be fitted upon the carcass. A puncture is repairable in the same way by removing the inner tube and a new tube can be fitted within the old casing. Casings can easily be repaired as there is no carcass connected with them. Each element, tube or casing, is replaceable and each retainable, hence a carcass is replaceable, or a tread is replaceable—whereas on cotton fibre tires the two are components of a single body.

I claim—

1. An inner tube for use in cooperation with an extensible casing, said tube having a rubber portion and spaced wires embedded therein, extending entirely helicoidally around the said tube and said wires being independent of each other throughout their length; said rubber portion and said wires in themselves constituting the sole means for resisting the tendency of the contained air to rupture the tube and casing.

2. An inner carcass for a pneumatic tire adapted for use with an outer independent casing, said carcass having a rubber portion and a plurality of wires angularly disposed relative to the circumferential axis of said carcass and helicoidally wound entirely around the said rubber portion and embedded in said rubber portion, each wire being independent of the others and separated from adjacent wires by the rubber portion, said wires thus constituting the sole strain resisting medium of the tire, and a valve portion through which air may be forced.

3. An inner strain resisting carcass for a pneumatic tire adapted for use in cooperation with a separate outer casing, said carcass comprising a rubber portion and a plurality of plies of independent wires extending angularly and entirely helicoidally around said carcass and embedded in said rubber portion, the wires of one ply being oppositely disposed relatively to the wires of the other ply, the plies thereby forming a mesh, said wires being all separated from each other by the rubber portion and being maintained in spaced relation thereby when said carcass is vulcanized.

4. In pneumatic tires, an inner tube including a carcass composed of a rubber portion and a plurality of wires wound entirely helicoidally around said tube and embedded in said rubber portion; said wires being disposed in a plurality of layers, each individual wire being separated from the adjacent wires of the same and other layers by the rubber, whereby said wires may flex independently without heating or abrading the other wires, said wires themselves solely constituting the means for resisting strains and carrying load.

5. An inner tube for use in cooperation with an extensible casing, said inner tube being composed solely of rubber and independent wires, said wires being helicoidally disposed therearound and embedded therein with each wire separated from the other by rubber, said inner tube constituting the load carrying and internal air pressure resisting carcass of the tire, said tube upon inflation being adapted to distend the cooperating extensible casing to the limit that the load resisting wires of the tube will permit.

6. The invention set forth in claim 5, in which the inner tube has a plurality of plies of wire embedded in said rubber, said plies and said wires separated from each other by said rubber; said plies oppositely disposed to each other thereby forming a mesh, the interstices filled with said rubber.

In testimony whereof I hereto affix my signature.

DANIEL M. WEIGEL.

cluding a carcass composed of a rubber portion and a plurality of wires wound entirely helicoidally around said tube and embedded in said rubber portion; said wires being disposed in a plurality of layers, each individual wire being separated from the adjacent wires of the same and other layers by the rubber, whereby said wires may flex independently without heating or abrading the other wires, said wires themselves solely constituting the means for resisting strains and carrying load.

5. An inner tube for use in cooperation with an extensible casing, said inner tube being composed solely of rubber and independent wires, said wires being helicoidally disposed therearound and embedded therein with each wire separated from the other by rubber, said inner tube constituting the load carrying and internal air pressure resisting carcass of the tire, said tube upon inflation being adapted to distend the cooperating extensible casing to the limit that the load resisting wires of the tube will permit.

6. The invention set forth in claim 5, in which the inner tube has a plurality of plies of wire embedded in said rubber, said plies and said wires separated from each other by said rubber; said plies oppositely disposed to each other thereby forming a mesh, the interstices filled with said rubber.

In testimony whereof I hereto affix my signature.

DANIEL M. WEIGEL.

CERTIFICATE OF CORRECTION.

Patent No. 1,633,963.                            Granted June 28, 1927, to

DANIEL M. WEIGEL.

It is hereby certified that error appears in the printed specification of the above numbered patent requiring correction as follows: Page 1, line 43, strike out the words "by the inner tube, more than by the" and insert instead "pneumatic tires, with a detachable"; and that the said Letters Patent should be read with this correction therein that the same may conform to the record of the case in the Patent Office.

Signed and sealed this 2nd day of August, A. D. 1927.

M. J. Moore,
Acting Commissioner of Patents.

Seal.

CERTIFICATE OF CORRECTION.

Patent No. 1,633,963.  Granted June 28, 1927, to

DANIEL M. WEIGEL.

It is hereby certified that error appears in the printed specification of the above numbered patent requiring correction as follows: Page 1, line 43, strike out the words "by the inner tube, more than by the" and insert instead "pneumatic tires, with a detachable"; and that the said Letters Patent should be read with this correction therein that the same may conform to the record of the case in the Patent Office.

Signed and sealed this 2nd day of August, A. D. 1927.

Seal.

M. J. Moore,
Acting Commissioner of Patents.